United States Patent [19]
Meyer

[11] Patent Number: 4,583,177
[45] Date of Patent: Apr. 15, 1986

[54] ACCURATE DME-BASED AIRBORNE NAVIGATION SYSTEM

[75] Inventor: Donald H. Meyer, Cedar Rapids, Iowa

[73] Assignee: Rockwell International Corporation, El Segundo, Calif.

[21] Appl. No.: 453,671

[22] Filed: Dec. 27, 1982

[51] Int. Cl.$^4$ .............................................. G01S 5/00
[52] U.S. Cl. .................................... 364/451; 343/7.3
[58] Field of Search ............................... 364/447–452, 364/443; 343/5 DP, 7 R, 7 A, 9 R, 7.3; 340/225, 992; 244/3.18

[56] References Cited

U.S. PATENT DOCUMENTS

| | | | |
|---|---|---|---|
| 3,581,073 | 5/1971 | Visher | 364/448 |
| 3,621,211 | 11/1971 | Perkins | 364/449 |
| 3,621,212 | 11/1971 | Hobbs | 364/449 |
| 3,659,085 | 4/1972 | Potter et al. | 364/449 |
| 3,796,867 | 3/1974 | Abnett et al. | 364/449 |
| 3,919,529 | 11/1975 | Baker et al. | 364/451 |
| 3,975,731 | 7/1976 | Latham et al. | 364/451 |

Primary Examiner—Errol A. Krass
Assistant Examiner—Thomas G. Black
Attorney, Agent, or Firm—Richard W. Anderson; Robert C. Mayes; H. Fredrick Hamann

[57] ABSTRACT

The system described herein uses distance information from aircraft to multiple ground stations of the TACAN, VORTAC, VOR/DME or DME type to determine position of the aircraft to a high degree of accuracy exceeding the normal capabilities of these types of equipment. The present system uses a scanning type DME unit which is rapidly sequenced to interrogate said multiple ground stations successively and determine distance thereto for all stations within range, and a computer to validate and process these distance measurements in sequence to provide an accurate computation and display of aircraft position and wind information.

8 Claims, 3 Drawing Figures

ACCURATE DME-BASED AIRBORNE NAVIGATION SYSTEM

BACKGROUND OF THE INVENTION

This invention relates generally to airborne navigation systems and more particularly to a system for determining aircraft location, wind information and lateral steering command from distance measurements made from plural ground transponders.

The system to be described herein thus relates to those systems which precisely locate aircraft in flight by making use of existing transponder systems of the TACAN, VORTAC, VOR/DME or DME type, by having the aircraft measure distances to a number of ground stations in rapid succession and utilizing these measured distances to compute aircraft position. The use of TACAN, VORTAC, VOR/DME or DME ground and airborne units to determine location is attractive and has heretofore been exploited because of the number of ground stations available all over the world, and because DME type units are well developed and utilized in many of today's aircraft. However, little attention has been devoted to using this type of equipment for precision measurements of location, mostly because the DME equipment was initially designed to provide convenient enroute navigation information which required only nominal accuracy.

In the prior art, for example, there is a large number and variety of systems available by means of which an aircraft may be located with respect to multiple ground stations, as by measuring the phase difference between signals emanating from the ground stations and processing them in the computer to compute the aircraft location. In other instances, by measuring distances between the aircraft and ground stations, and processing these ranges in a computer, aircraft position has been obtainable. This type of system is discussed in a paper by Latham, in the publication "Navigation", Vol. 21, No. 2, 1974. The type of system therein described depends on prior storage of a limited number of available stations in the immediate service area and range gate prepositioning to reduce range measurement time. Such systems give rise to attendant ground station saturation problems and generally utilize a "track" mode to achieve the required accuracy. The system to be described is of this general type, since it involves interrogation of DME ground station transponders and utilizes replys from the ground stations to the aircraft.

To achieve a high degree of accuracy while utilizing existing navigation facilities, more than the minimum number (usually considered to be three to avoid ambiguity) of ground station measurements must be obtained, and an increase beyond this number of measurements yields greater accuracy. Such systems have been utilized by processing distance measurements from a plurality of ground DME stations (all within range) in a computer towards achieving maximum accuracy in the operating environment. In these types of systems sufficient redundant information permits the computer to estimate the error in each of the distance measurements and compensate for these errors to improve the position accuracy. Such an approach is disclosed in Potter et al., U.S. Pat. No. 3,659,085. Further known systems of this type are described in Miller U.S. Pat. No. 4,035,801 and Chisholm et al. U.S. Pat. No. 3,821,523. Chisholm et al. U.S. Pat. No. 3,821,523, for example, relates to a system utilizing a single DME unit in the aircraft of the agile tuning type which is presently available and causes the airborne DME unit to rapidly tune to a predetermined number of preselected DME ground stations and utilizes the distance measurements along with the coordinate location and elevation of the associated ground stations in a computer algorithm to obtain instant aircraft location. In the known prior art, however, a selected (preset) number of ground stations within a service area in which the aircraft is to be flown are set into the system control, and distance determinations are available for operation within the service area of the selected ground stations by causing the DME interrogator unit in the aircraft to tune in sequence to the preselected ground stations.

SUMMARY OF THE INVENTION

One of the primary objects of the present invention is to provide a system using existing TACAN, VORTAC, VOR/DME or DME type ground stations in cooperation with a single airborne DME unit which is modified to scan all frequency channels as opposed to a preselected fewer number of channels, and, in conjunction with a general purpose computer, to provide aircraft position with improved accuracy by utilization of a greater number of distance measurements to a greater number of ground stations during operation. Rapid scanning of all frequency channels is possible with state of the art DME interrogators and thus the past difficulty of tuning DME interrogators to different ground stations rapidly enough to obtain information at a rate permitting increased accuracy is obviated by state of the art rapid scanning DME interrogators.

The present invention is featured in the provision of a rapid scanning single DME interrogator unit in an aircraft which is capable of changing channels rapidly and making distance measurements rapidly and which uses electronic transmitter and receiver tuning means along with rapid search and tracking means. The receiver is caused to tune through all available channels and output any range measurements made along with channel number to a computer. The system allows approximately one second for tuning to a channel and outputting any measurement thereon and then tuning to the next succeeding channel. All standard X and Y channels are sequence tuned in numerical order. If a reply is not received from a ground station transponder on a particular channel, the DME unit tunes to the next channel after approximately a 0.2 second search interval and starts a search for the next station. Channels are not preselected. Information is given to the computer concerning channel number and distance on a digital interfaced bus. The computer, utilizing a look-up ROM to provide earth coordinate locations of all existing DME ground transponders versus the channel number to which a transponder is assigned, computes (from a last-computed present earth coordinate location of the aircraft), the present position of the aircraft, compares the computed present position with the measured present position, and validates the channel if the measured and computed ranges are within a predetermined tolerance.

If the comparison is not valid, the table of channel numbers versus ground station locations is sequenced for any next station location for that particular channel until a valid station is located by the above-defined comparison means.

If no such valid station is found for that channel, the DME transponder is sequenced to the next succeeding channel. Since there may or may not be a reply from a ground station for a succession of tuned channels, the system employs time-skewing of distance measurements. This time skewing is aided by continuous comparison (update) of present position by integration of air speed and heading into the computer at a much faster rate (such as every 0.2 seconds) than distance measurements are available. As a distance measurement is received by the computer, a calculation based on that measurement and the ground station location (as stored in the computer) is made to effect present position update.

All stations for which a valid distance measurement is obtained are processed in the computer in a like manner. Thus, any one of 126 X channels and 126 Y channels within DME reply range may provide a distance measurement. Typically, at higher cruising altitudes (for example, 20,000 or 30,000 feet) as many as twenty to thirty stations may be received. The greater the number of stations processed, the greater in general the position determination accuracy with an attendant improvement in the determination of wind magnitude and direction. It then becomes possible to obtain nearly inertial reference system quality wind information for taking advantage of wind conditions to realize fuel savings.

The system to be described is further featured in the provision of a means for unloading the currently experienced interrogation rate on ground stations being interrogated by a plurality of aircraft by spending very little time interrogating any one ground station, since the system rapidly tunes the airborne interrogator to all existing channels. For example, assuming twenty aircraft in the same area, each aircraft having an interrogator channeling through 126 X channels for one second each and a single station in the region, then, on the average, the subject ground station would be interrogated $20/126 \times 100 = 15.8\%$ of the time over a 126 second (2.1 minute) interval. This low duty cycle would tend to unload the current interrogation rate on ground stations where twenty aircraft typically may be interrogating a single station continuously. Hence the system to be described herein offers an improvement in ground station transponder loading by providing a rapidly scanning airborne interrogator.

BRIEF DESCRIPTION OF THE DRAWINGS

These and other features and objects of the present invention will become apparent upon reading the following description with reference to the accompanying drawings in which.

DETAILED DESCRIPTION OF A PREFERRED EMBODIMENT

Figure 1:
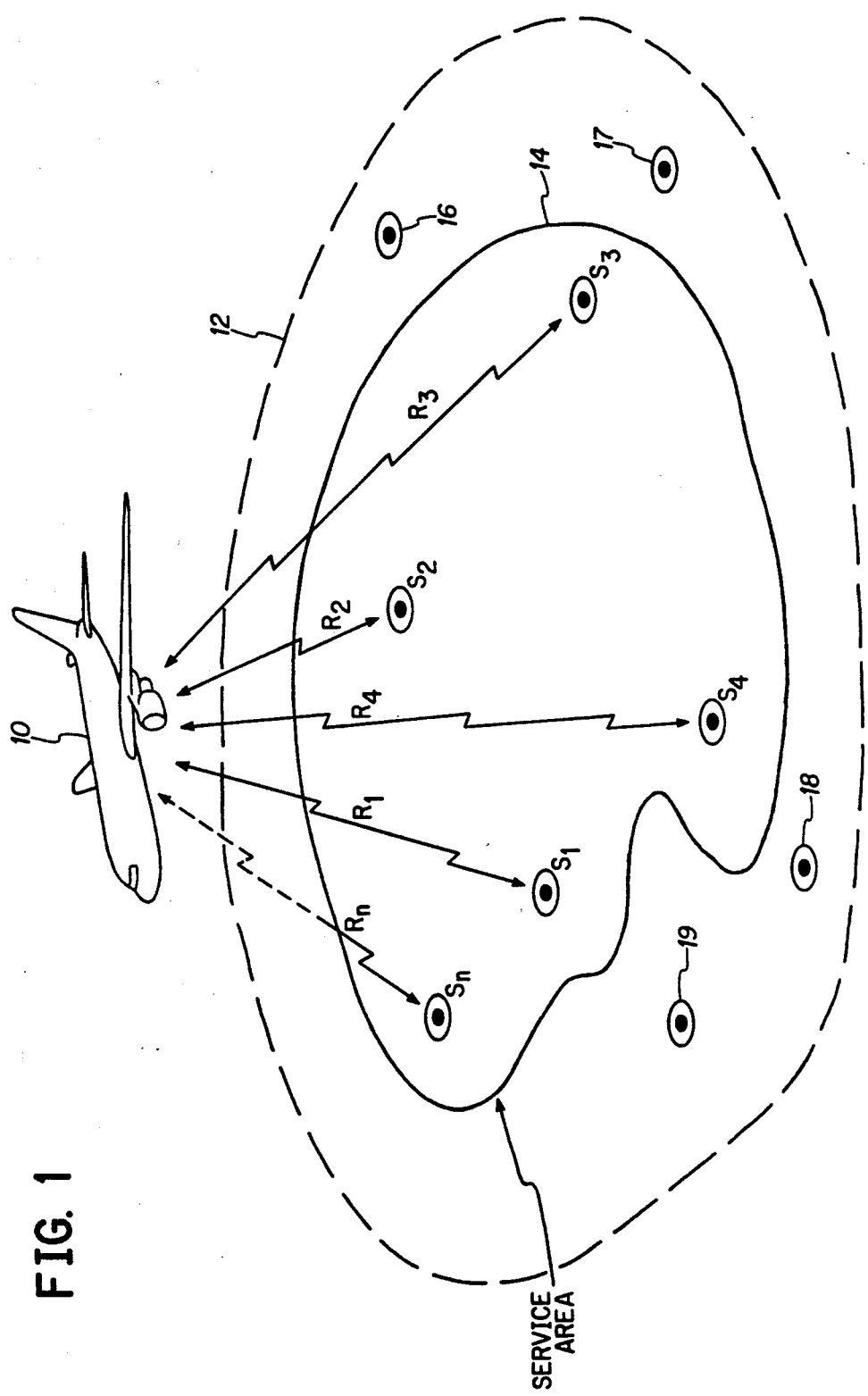
FIG. 1 is a pictorial representation of a group of ground stations (no specific number) being interrogated by an aircraft within transmit and receive range.

With reference to FIG. 1, an aircraft 10 carrying a rapid scanning DME interrogator is pictorially illustrated flying above the earth 12 on which are located DME transponder ground stations within a transmit/receive service area designated by reference numeral 14. The interrogator carried on aircraft 10 is illustrated as interrogating a plurality of ground stations depicted as $S_1, S_2, S_3, S_4, -S_n$ lying within the service area 14, with the slant range distances as measured by the DME interrogator depicted as $R_1, R_2, R_3, R_4, -R_n$. The service area 14 is defined by the slant range distances between the aircraft 10 and the particular ground stations, and typically the service area may be 200 to 300 miles in radius depending upon the altitude of the aircraft and the maximum range of the particular DME unit utilized. It is to be emphasized that FIG. 1 is intended to depict any and all ground stations which lie within the service area of the DME employed at any particular point in time as the aircraft progresses in flight. Thus, the number of ground stations from which distance determinations are made will change as the aircraft progresses in flight and depending upon the altitude of the aircraft and its attendant effect upon service area range. FIG. 1 further depicts a plurality of stations 16, 17, 18 and 19 lying outside the service area of the DME and from which no distance measurements are obtained for the particular geographical location of the aircraft at the depicted instant.

Figure 2:
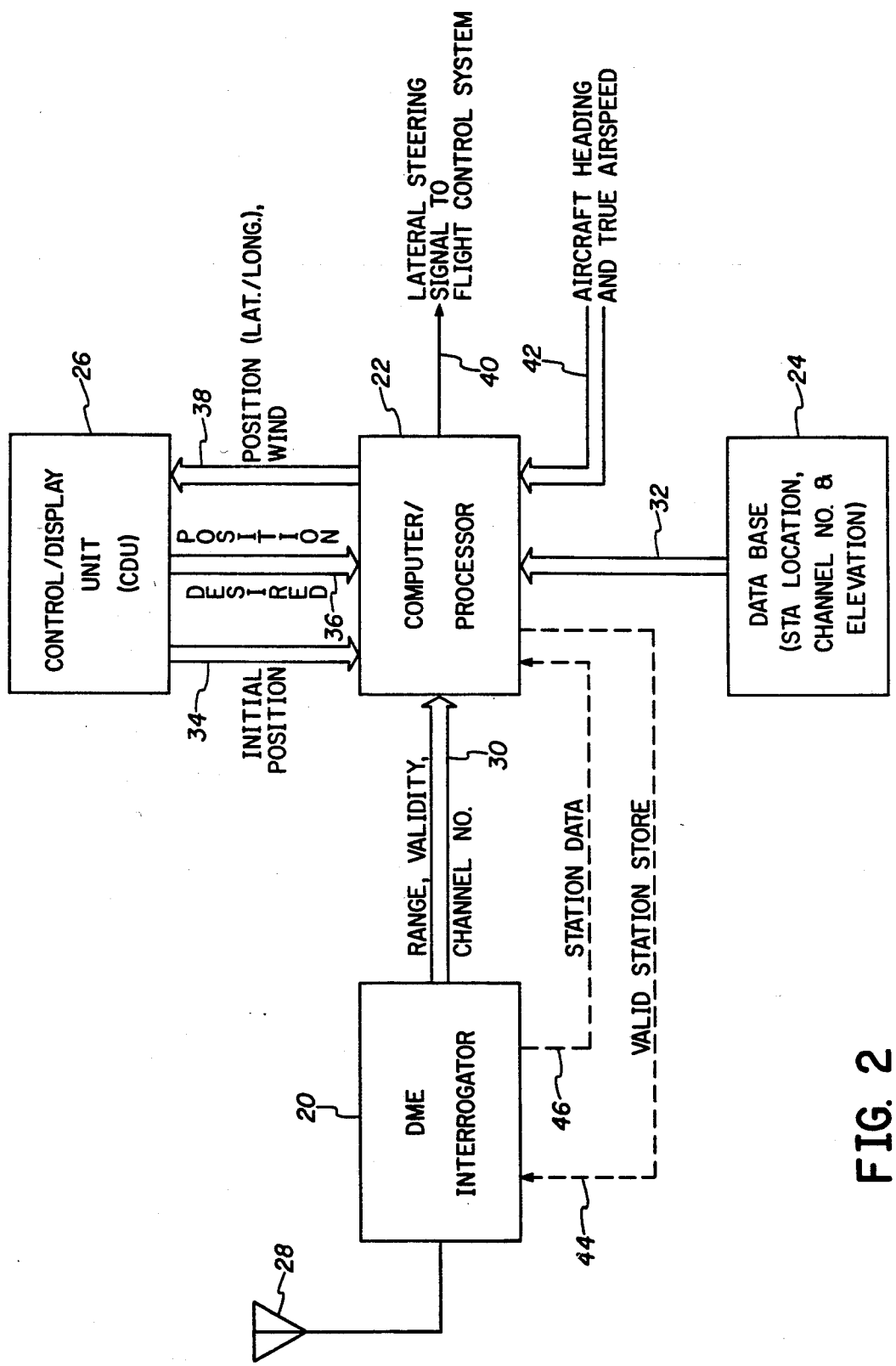
FIG. 2 is a block diagram of the system according to the present invention depicting functional interrelationship between computer, DME unit and control display unit as would be contained in each aircraft.

With reference to FIG. 2, a block diagram of the navigation system includes a digital scanning DME unit 20 including an antenna 28 through which the ground transponders S1, S2-Sn are interrogated by channeling the DME interrogator 20 through all X channels and all Y channels and receiving replies from those stations within range. For those stations responding, the scanning DME interrogator 20 sends a range measurement and channel number on digital bus 30 to a computer/processor 22. The scanning DME interrogator may be a standard unit manufactured by various companies, for example, the Rockwell-Collins type DME-700, which outputs the range and channel number on digital bus 30. The computer/processor 22 receives this information and, using either the initial position of the aircraft as inputted via bus 34 from control/display unit 26, or the computed position (present position), and computes an updated present position based on knowledge of the ground station's location which has been stored in a data base 24 and inputted via bus 32 to computer/processor 22. The control/display unit 26 additionally has provisions for displaying the newly computed aircraft position and comparing it with a desired position (a destination) which may have been entered into the control/display unit 26 and provided via bus 36 to further compute a deviation signal 40 useful in steering the aircraft to the desired position.

Figure 3:
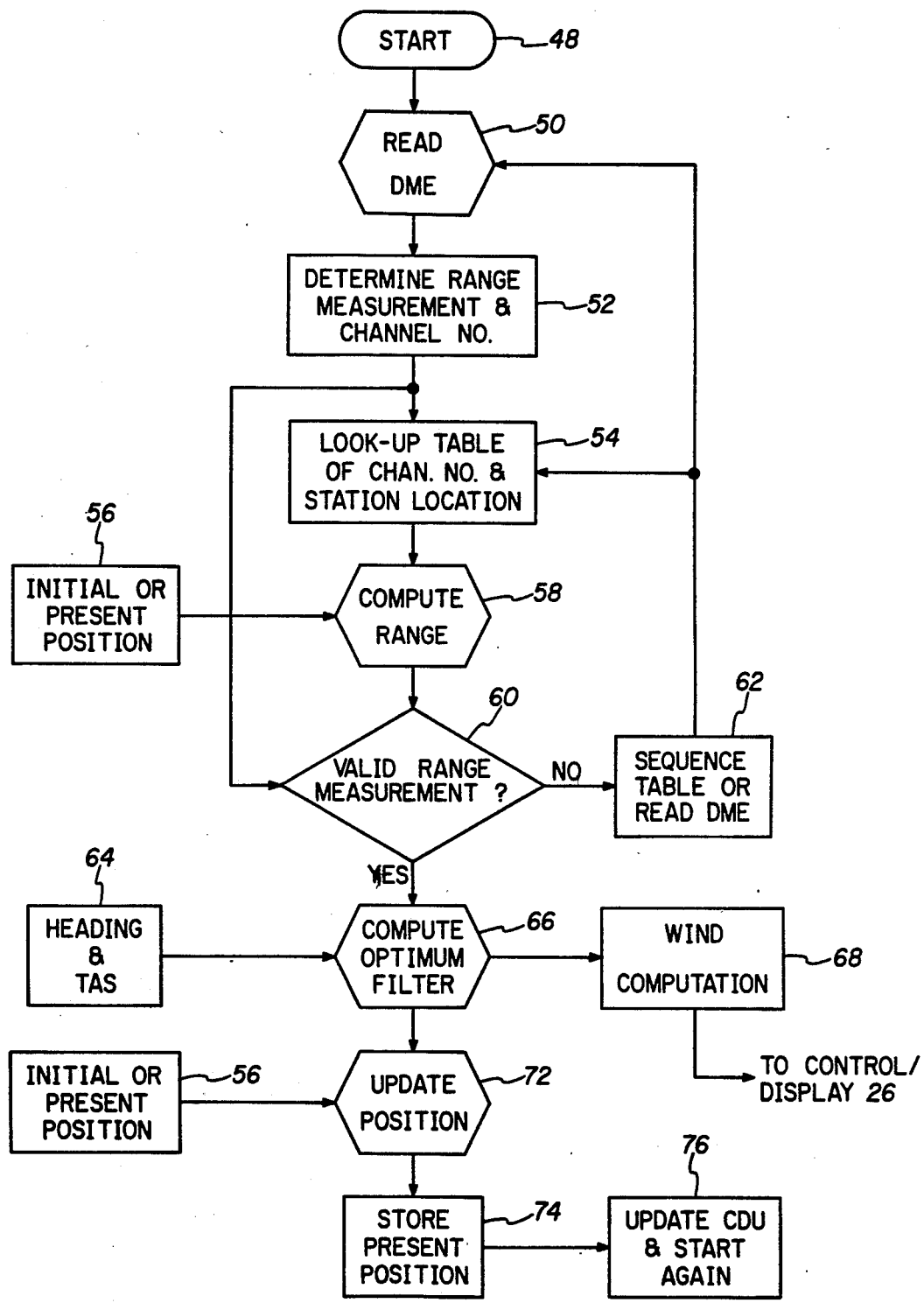
FIG. 3 is a flow diagram illustrating computer processing steps for computing the position of the aircraft along with determination of wind velocity and wind direction.

In addition to interfacing with the DME interrogator 20, the data base 24 and the control/display unit 26, the computer/processor 22 also contains an arithmetic processor, memory, and programs to process the subroutines by means of which wind information and aircraft position are computed. As will be further described, iterative computation in accordance with a flow chart depicted in FIG. 3 are repeated for each new range/station input from DME interrogator 20.

After processing the navigational information, the computer/processor 22 outputs the position information on bus 38 for display on control/display unit 26 and outputs lateral steering signal on line 40 for use in an associative flight control system.

As previously mentioned, the system employs a data base 24 which stores channel number versus station locations for all ground stations. FIG. 2 illustrates an alternative mechanization depicted in dashed line where station data may be stored in memory located in the DME interrogator 20 with the station data being sent to the computer/processor 22 via interconnect 46 when a ground station reply is received with the computer providing valid station information to DME interrogator 20 via interconnect 44. This option could be available either for storage of station data in the interrogator, or in the event that station data may in the future be encoded on the transponder signal and made available to the system via that means.

The computer/processor 22 of FIG. 2 is programmed to sequence operations, conduct arithmetic operations, accept data from the control/display unit 26, and output data to the control/display 26 for display to the crew, in addition to providing a steering signal to follow a desired course. The control/display entered intitial position via bus 34 is required to allow processing the very first range measurement and the computation of present position in the event of a time lag between takeoff and determination of the first distance measurement. Initially, the DME interrogator 20 is continuously running and attempting to interrogate ground stations, one by one, through all 126 X channels and through all 126 Y channels. If no reply is received in 0.2 seconds, the DME interrogator 20 progresses to the next sequential channel. When a search is made for a reply, and a reply is received, the range measurement is processed in the DME interrogator 20, and the range and channel number for the replying station is stored in the DME interrogator 20 for 0.8 seconds to be read by the computer/processor 22 on digital bus 30. A validity bit is set into the digital word to indicate to the computer/processor 22 that the range data is ready. The computer program has an instruction to read the DME digital data on bus 30 every 0.2 seconds approximately, that is, a computational rate every five seconds.

As above discussed, a scanning DME interrogator can tune to a new channel and search for a transponder reply from each ground station and lock onto the ground station in about 0.2 seconds, and then start tracking to make a range measurement which may take up to 0.8 seconds longer. A typical scanning DME interrogator remains in the rapid interrogation mode throughout "search" and "track". When track is accomplished, an indication is given that the range measurement is valid.

Referring now to the flow chart of FIG. 3, which depicts computer steps for the navigation system of the present invention, after the operator has entered the initial position of the aircraft via a keyboard on the control/display unit 26 of FIG. 2, the program is initiated as depicted by START block 48 of FIG. 3. Upon initiation of the program via START block 48, digital data from the DME interrogator 20, appearing on bus 30, is read as depicted by READ DME block 50. Upon receiving a validity indication as concerns the DME input, DETERMINE RANGE MEASUREMENT AND CHANNEL NO. step 52 stores the range measurement for the station and the channel number for the station. In LOOK-UP TABLE OF CHANNEL NO. AND STATION LOCATION step 54, a station location in latitude/longitude coordinates is found corresponding to the station channel number. In the above described alternate system a station location might be transmitted by the transponder and not stored. It is noted that more than one station may be stored under a given channel number since there is duplication throughout the United States and the world. However, stations with the same channel number (co-channel stations) are located greater than 200 miles apart. From knowledge of the station location, and the vehicle's initial or present position as inputted via INITIAL OR PRESENT POSITION block 56, a range is computed in COMPUTE RANGE step 58 between the aircraft and the station. This computed range is then compared with the measured range with some tolerance in VALID RANGE MEASUREMENT step 60 (for example, within five miles) to verify that the station chosen from the data base (step 54) is valid. If these two ranges do not compare, another station location is determined for that same channel number, and if none exists, the DME input via SEQUENCE TABLE OR READ DME step 62 is read.

When a valid range measurement is determined in step 60, the measurement enters a COMPUTE OPTIMUM FILTER subroutine 66, which has an input from aircraft heading and true air speed (TAS) from HEADING and TAS block 64. The optimum filter, to be further mathematically described, computes incremental updates to the initial or present position from block 56 in UPDATE POSITION block 72. The updated position is then stored as present position in STORE PRESENT POSITION step 74.

The optimum filter subroutine in step 66 provides a wind computation, 68, and the latest present position is sent to the control/display unit 26 in accordance with a display subroutine. The complete process is then started again. The total processing time is less than 0.2 seconds, such that the DME interrogator 20 can be read in less than this time interval, and the optimum (KALMAN) filter can be computed five times per second. After present position is computed in step 74, it is also stored in steps 56 in order to be available for the other subroutines.

The computer steps for obtaining and updating aircraft position and providing wind computation, as depicted in FIG. 3, may be then generally summarized as follows:
(1) Read DME range and channel.
(2) Look up channel number and obtain station location.
(3) Compute from present position and station location from step (2), the range to that station.
(4) Compare computed range with measured range read from DME.
(5)
  (a) If comparison is valid—compute optimum filter to update position and store and update control-display unit, and to compute wind and update control display unit and start again.
  (b) If comparison in (5)(a) is not valid, sequence through table for any further station location for that channel and repeat steps (3) and (4) for further station location.
  (c) If there is no further station for that channel, read DME for a new measurement as in step (1).

It is thus seen that the computer program permits the aircraft to fly through permutations of sets of pluralities of ground stations within an instant service area. All stations within the instant service area are interrogated. Station replies are processed to determine range, and each replying station is positively identified using its location and elevation along with a measured distance in the iterative computer calculation to continuously determine and update aircraft position as it comes within range of different ones of permutations of replying ground stations. The system, as opposed to previous systems, does not limit the operation to flight within a predetermined service area wherein stations within that service area must be selectively preset into the system. Only the initial position of the aircraft when it begins a flight need be inserted by the pilot into the system. In essence, the system of the present invention automatically includes each new ground station as it comes within the service area of the airborne DME interrogator by including that station's distance measurement into the computer algorithm from which aircraft location determination is made.

An iterative algorithm which is of extreme value in determining aircraft position and wind information is found in AIAA paper 69-841, "The Optimum Complementation of VOR/DME with Air Data" by Hemesath as published in the "Journal of Aircraft", Vol. 8, No. 6, June 1971, pp. 456–460. In this case, the DME range measurements are processed, one at a time, in cooperation with aircraft true air speed and heading inputs.

Letting $R_e$ and $R_n$ represent the east and north position errors at a point in time, and letting $V_{re}$ and $V_{rn}$ represent the east and north components of random wind, and $V_{be}$ and $V_{bn}$ represent the east and north wind biases, the position velocity errors are the wind components, and the east and north position velocity errors become:

$$\dot{R}_e = V_{re} + V_{be} \quad (1)$$

$$\dot{R}_n = V_{rn} + V_{bn} \quad (2)$$

For the random wind components assume, $$\dot{V}_{re} = \beta_w V_{re} + \beta_w N_{ve} \quad (3)$$

and $$\dot{V}_{rn} = \beta_w V_{rn} + \beta_w N_{vn} \quad (4)$$

where $1/\beta_w$ is the correlation time (assumed the same for both north and east) and $N_{ve}$ and $N_{vn}$ are white-noise forcing functions whose spectral densities are both $2\sigma_w^2/B_n$. The assumed wind variance is $\sigma_w^2$ for each axis. The wind bias components, since they are constants, derivatives which obey, $$\dot{V}_{be} = 0 \quad (5)$$

$$\dot{V}_{bn} = 0 \quad (6)$$

Assume that the DME errors consist of a random component, a bias component and a white noise component. Then, as for the assumed wind, there are noise and bias components for each that can be written, $$\dot{r}_{DME} = -\beta_{DME} R_{DME} + \beta_{DME} n_{DME} \quad (7)$$

$$\dot{b}_{DME} = 0 \quad (8)$$

The above equations then consitute, with the assumption given, a complete description of the dynamics associated with position and velocity errors.

Consider first an errorless DME measurement, $\rho_r$ and a corresponding computed range (from dead-reckoned position), designated $\rho_{dr}$. If the position errors, $R_e$ and $R_n$, are interpreted as actual minus estimated, it can be shown that the difference is, $$\rho_{dr} - \rho_r = R_e \sin\theta + R_n \cos\theta \quad (9)$$

where $\theta$ is the bearing to the DME station. The angle $\theta$ can be computed from knowledge of the aircraft's present position and the location of the station in latitude and longitude.

Since the DME range measurement is not errorless, when the various range errors are included in the previous equation, there results $$\rho_{dr} - \rho_r = R_e \sin\theta + R_n \cos\theta + r_{DME} + b_{DME} + W_{DME} \quad (10)$$

where $W_{DME}$ is the white component of range noise.

Now, equations (1) through (8) are the state equations and (9) and (10) are the measurement equations for the classical Kalman filter implementation. As a simplification let the sensor biases be ignored and the random wind and wind bias be combined. That is, let $V_e = V_{re} + V_{be}$ and $V_n = V_{rn} + V_{bn}$. Then, $$\dot{V}_e = \dot{V}_{re} + \dot{V}_{be} = n_e \quad (11)$$

$$\dot{V}_n = \dot{V}_{rn} + \dot{V}_{bn} = n_u \quad (12)$$

and from equations (1) and (2) there is obtained $$\dot{R}_e = V_e \quad (13)$$

$$\dot{R}_n = V_n \quad (14)$$

The simplified state equations are then, $$\dot{R}_e = V_e \quad (15)$$

$$\dot{R}_n = V_n \quad (16)$$

$$\dot{V}_e = N_e \quad (17)$$

$$\dot{V}_n = N_n \quad (18)$$

And the measurements of position error are, $$\rho_{dr} - \rho_r = (\sin\theta \ \cos\theta \ 0 \ 0) \begin{pmatrix} R_e \\ R_n \\ V_e \\ V_n \end{pmatrix} + n_{DME} \quad (19)$$

where the state vector is defined as, $$X = \begin{pmatrix} R_e \\ R_n \\ V_e \\ V_n \end{pmatrix} = \begin{pmatrix} \text{East error in dead-reckoned position} \\ \text{North error in dead-reckoned position} \\ \text{East dead-reckoned velocity error} \\ \text{North dead-reckoned velocity error} \end{pmatrix}$$

The standard approach presumes that raw dead-reckoning is occurring. That is, if $V_{de}$ and $V_{dn}$ are the east and north components of uncorrected airspeed and if $R_{de}$ and $R_{dn}$ are the corresponding whole value east and north position components, the dead reckoned position is obtained, $$R_{de} = \int_0^t V_{de}(\tau) d\gamma \quad (20)$$

$$R_{dn} = \int_0^t V_{dn}(\tau) d\gamma \quad (21)$$

where the position has been initialized, and $R_e$ and $R_n$ in equation (19) from above are the errors in $R_{de}$ and $R_{dn}$, respectively. If $R_{te}$ and $R_{tn}$ are the true values of east and north position, then it follows that, $$\hat{R}_{te} = R_{de} + \hat{R}_e \quad (22)$$

$$\hat{R}_{tn} = R_{dn} + \hat{R}_n \quad (23)$$

The position errors, $\hat{R}_e$ and $\hat{R}_n$ are estimated by the Kalman filter process, and applied to the dead-reckoned position to give an estimate $\hat{R}_{te}$ and $\hat{R}_{tn}$ of the true position in an iterative process taking place about 5 times per second.

From the best estimate of range in the east and north directions it becomes possible to compute iteratively a new lattitude and longitude from the previous position as shown above which occurs in step 72 and concludes with storage of present position in step 74. The display subroutine is then called in step 76 to display position and then to restart the iterative process.

Since the velocity errors $V_e$ and $V_n$ are essentially the east and north components of wind, the total wind magnitude and wind direction can be found from the following relationships in WIND COMPUTATION step 68:

$$\text{WIND MAGNITUDE} = \sqrt{V_e^2 + V_n^2}$$

$$\text{WIND DIRECTION} = \tan^{-1} \frac{V_n}{V_e}$$

Wind magnitude and direction can then be displayed in true coordinates by a call from the display subroutine and appropriate display means on the control/display unit 26.

The present invention is thus seen to provide a determination of aircraft position to a high degree of accuracy by utilizing a scanning type DME unit which is rapidly sequenced to interrogate multiple ground stations successively and determine distance thereto for all stations within range. A computer is utilized to process these multiple distance informations in sequence and to provide an accurate computation and display of aircraft position and wind information. The service area for the aircraft carrying the system of the present invention is automatically extended to include all new stations as they come within range and automatically exclude those which fall out of range. Means are provided to positively identify the particular ground station from which a distance of reading is obtained by utilizing stored ground positions for every ground DME in service along with the instantly computed aircraft position to calculate a range, and compare this range with the measured range. A predetermined correlation between the calculated range and the measured range affects a validity determination of a particular ground station from which to a distance determination is made, and the earth coordinates of that identified ground station are then utilized in the iterative computer algorithm to determine an updated aircraft position.

Although the present invention has been described with respect to a particular embodiment thereof, it is not to be so limited as changes might be made therein which fall within the scope of the present invention as defined in the appended claims.

I claim:

1. Apparatus adapted to be carried by an aircraft for determining its absolute position comprising:
    a single DME interrogator capable of being tuned to all available DME channels,
    means for repeatedly cycling said DME interrogator to sequentially tune all said channels,
    said DME interrogator searching each of said channels to produce a search mode signal approximately representative of the distance indicated by detected DME responses on respective ones of said receiving channels responses from interrogated DME stations,
    a computer including a memory containing positional data associated with all said interrogated DME stations, said computer for calculating the present absolute position of said aircraft,
    means for indicating the channel on which said DME interrogator is instantaneously being operated,
    means responsive to said channel indicating means for addressing said memory when a DME response appears on said channel on which said DME interrogator is instantaneously being operated to thereby identify the DME station responding, as a function of said memory containing positional data for all DME stations, said channel indication, and said present absolute position of said aircraft, and
    means for displaying the absolute position calculated.

2. The apparatus defined in claim 1, wherein said computer memory comprises earth coordinate and elevation storage for all ground transponders operating on each of said channels, and means for validating each successive one of said DME interrogator search mode distance signals by comparing the measured search mode distance signal with a distance computed from computer defined present aircraft position and a stored earth coordinate position for one of the ground transponders operating on the channel associated with the instant operating channels of such DME interrogator.

3. The apparatus defined in claim 2, wherein said computer is programmed with a sub-routine which is repeated a plurality of times in response to each said distance search mode output signal presented thereto by said DME interrogator, each of the iterative cycles of said subroutine comprising computation of wind velocity and direction and present position information of said DME interrogator, with means to update the computer developed values of those informations for output to utilization means.

4. The apparatus defined in claim 3, comprising means for initializing said computer by inputting to said computer the present position of said DME interrogator upon activation of said apparatus.

5. The apparatus defined in claim 4, comprising means for entering a desired position of said aircraft into said computer, means comparing said desired position with the instant position as determined by said computer, and means responsive to such comparison to compute a lateral steering signal for effecting said desired position.

6. In a system comprising a DME interrogator outputting a signal definitive of distance to a DME ground transponder and the channel number upon which said DME interrogator is operating, means for identifying the ground transponder from which a reply is received to provide such distance definitive signal comprising:
- a computer receiving successive distance-definitive signals from successive ones of a plurality of DME channels, measuring respective distances, and computing therefrom the present earth coordinate position of said DME interrogator,
- computer look-up table means including DME channel number addressed earth-coordinate data for each said ground DME transponder operating on successive channels to which said DME interrogator is tuned, and
- means responsive to channel number addressed earth-coordinate locations of DME ground transponders operating on a DME interrogator-defined channel number and to the instantly computed DME interrogator location coordinates, to compute the distance to said locations, said ground transponder location coordinates being identified as a function of a compare, within a predefined tolerance, of said computed distances with said measured distances, thereby identifying said ground transponder.

7. A DME navigation apparatus having a first estimated position comprising:
- means for sequentially interrogating all available DME transponders and channels, receiving responses from a portion thereof, measuring respective distances to responding transponders, and storing channel identified distances actually measured;
- means for computing positions of responding channel identified transponders using said first estimated position and said measured distances;
- means for comparing said computed positions to a previously-stored memory containing actual positions of said all available DME transponders and for thereby, as a result of said comparing, identifying said responding transponders; and
- updating said first estimated position as a function of said actually-measuring distances to said identified transponders.

8. An apparatus as in claim 7 wherein said all available transponders and channels further comprise at least one hundred channels.

* * * * *